United States Patent
Viennot et al.

(10) Patent No.: US 10,399,669 B2
(45) Date of Patent: Sep. 3, 2019

(54) AIRCRAFT FLIGHT CONTROL SURFACE ACTUATOR

(71) Applicant: Safran Electronics & Defense, Boulogne-Billancourt (FR)

(72) Inventors: Severin Viennot, Boulogne-Billancourt (FR); Thierry Cartry, Boulogne-Billancourt (FR); Marc Lebrun, Boulogne-Billancourt (FR)

(73) Assignee: SAFRAN ELECTRONICS & DEFENSE, Boulogne-Billancourt (FR)

(*) Notice: Subject to any disclaimer, the term of this patent is extended or adjusted under 35 U.S.C. 154(b) by 0 days.

(21) Appl. No.: 15/517,325

(22) PCT Filed: Nov. 19, 2015

(86) PCT No.: PCT/EP2015/077165
§ 371 (c)(1),
(2) Date: Apr. 6, 2017

(87) PCT Pub. No.: WO2016/079270
PCT Pub. Date: May 26, 2016

(65) Prior Publication Data
US 2017/0305533 A1    Oct. 26, 2017

(30) Foreign Application Priority Data
Nov. 20, 2014 (FR) ..................... 14 61246

(51) Int. Cl.
*F16H 35/10* (2006.01)
*B64C 13/34* (2006.01)
(Continued)

(52) U.S. Cl.
CPC ............... *B64C 13/34* (2013.01); *F16H 1/46* (2013.01); *F16H 35/10* (2013.01);
(Continued)

(58) Field of Classification Search
CPC ................................................. F16H 2035/103
See application file for complete search history.

(56) References Cited

U.S. PATENT DOCUMENTS 4,856,379 A * 8/1989 Jafarey ................... B64C 13/28
                                                    403/356
5,518,466 A   5/1996 Tiedeman
(Continued)

FOREIGN PATENT DOCUMENTS

EP        0826902 A2    3/1998

OTHER PUBLICATIONS

French Search Report with English Language Translation Cover Sheet dated Jul. 21, 2015, FR Application No. 1461246.
(Continued)

*Primary Examiner* — Tisha D Lewis
(74) *Attorney, Agent, or Firm* — Womble Bond Dickinson (US) LLP (57) ABSTRACT

An actuator for a flight control surface of an aircraft, including: a fixed annulus for fixing to the fuselage, an rotatable annulus with respect to the fixed annulus about an axis of rotation, an output ring which can be fixed to the control surface, and a coupling mechanism having a disc with translational mobility with respect to the mobile annulus in a direction parallel to the axis of rotation, the disc able to move between an engaged position, and a disengaged position, in which the disc is disengaged from the mobile annulus to disconnect the output ring from the mobile annulus. A retaining piece keeps the disc in the engaged position, and a rupture member activates to break the retaining piece to allow the disc to move into the disengaged position.

12 Claims, 5 Drawing Sheets

(51) Int. Cl.
*F16H 1/46* (2006.01)
*F16H 1/28* (2006.01)

(52) U.S. Cl.
CPC .............. *F16H 2001/289* (2013.01); *F16H 2001/2881* (2013.01); *F16H 2035/103* (2013.01)

(56) References Cited

U.S. PATENT DOCUMENTS 8,839,926 B2 * 9/2014 Hou .................. F16D 11/16
                                                      192/101
9,016,623 B2 * 4/2015 Maclean ............. B64C 9/02
                                                      244/99.2

OTHER PUBLICATIONS

International Search Report with English Translation dated Feb. 9, 2016, Application No. PCT/EP2015/077165.

\* cited by examiner

AIRCRAFT FLIGHT CONTROL SURFACE ACTUATOR

FIELD OF THE INVENTION

The invention relates to an aircraft flight control surface actuator, and an actuator assembly comprising such an actuator.

PRIOR ART

In airplanes, control surfaces (flaps or movable ailerons) allow the flow of the surrounding air over the surface of the airplane to be modified, so as to control the position of the airplane in space.

Control surfaces comprise for example primary flight control surfaces which are actuated during the flight phase, and secondary flight control surfaces (leading edge slats, high-lift flaps) which are actuated only during certain low-speed phases, particularly the take-off and landing phases.

Of the primary flight control surfaces, the ailerons located at the ends of the wings of the airplane make it possible to control the roll motion of the airplane.

These control surfaces are mounted pivotally with respect to the fuselage of the airplane.

Each control surface can be actuated mechanically by several control actuators housed in the wing of the airplane, so that in the event of a failure of one of the actuators, another actuator can take over.

The actuators can be hydraulic actuators or electromechanical actuators, linear or rotary.

Electromechanical actuators, however, have the risk of seizure which can bring about blocking of the control surface. In the event of a seizure, it is therefore necessary to decouple the seized actuator from the control surface so as to allow actuation of the control surface by the other actuator(s), so as to avoid damaging the control surface or the actuators.

For this purpose, decoupling devices are known comprising a part capable of rupturing when it is subjected to a torque greater than a predetermined limit torque.

Document EP 0 826 902 describes for example a rotary actuator comprising a shear piece providing a connection between an input shaft and a sun gear. In the event of seizure of the actuator, the shear piece is subjected to a shear force between the input shaft and the sun gear. When the shear force exceeds a certain threshold, the shear piece is ruptured. The rotation of the input shaft with respect to the sun gear then causes a translation movement of a decoupling nut through a screw-nut connection, the movement of the nut having the effect of actuating a decoupling mechanism so as to disconnect an output ring of the actuator from a movable gear.

One disadvantage of this device is that the shear piece must be capable of reliably rupturing when it is subjected to a shear force greater than a predefined threshold, while still being capable of transmitting high torques near the rupture threshold, and resisting fatigue loads. This becomes particularly problematical when the fatigue rupture mode becomes dominant.

Now the rupture threshold of the shear piece depends on the dimensions and the characteristics of the material forming the piece, this threshold possibly varying based on the operating conditions of the actuator.

Moreover, the predefined rupture threshold is not necessarily compatible with all flight control applications. However, it is not possible to adjust the threshold depending on these applications.

Finally, the rotary actuator has considerable bulk due to the presence of the decoupling mechanism, and the decoupling mechanism itself poses a jamming hazard.

SUMMARY OF THE INVENTION

One goal of the invention is to propose an actuator adapted to be reliably decoupled from the control surface in the event of jamming while still having a reduced use of space.

This aim is attained within the scope of the present invention thanks to an aircraft flight control surface actuator, comprising:
- at least one fixed gear capable of being attached to the fuselage of the aircraft,
- at least one gear rotatably movable with respect to the fixed gear around an axis of rotation,
- an output ring capable of being attached to the flight control surface, and
- a coupling mechanism comprising a disk movable in translation with respect to the movable gear in a direction parallel to the axis of rotation, the disk being movable between an engaged position in which the disk is in engagement both with the movable gear and the output ring so as to make the ring secured to the movable gear, and a disengaged position in which the disk is disengaged from the movable gear so as to decouple the output ring from the movable gear, a retaining part capable of retaining the disk in the engaged position, and a rupture member capable of being activated to rupture the retaining part, so as to allow displacement of the movable disk into the disengaged position.

In this manner, in normal operation, it is the movable disk and not the retaining part which provides for transmission of torque between the movable gear and the output ring. The retaining part has as its only function to retain the movable disk in the engaged position.

Moreover, the retaining part can be ruptured on command by activation of the rupture member, which makes it possible to control with precision the conditions for transition from the normal operating mode to the decoupled operating mode. These conditions can vary depending on flight control applications.

Finally, due to its simplicity, the proposed device makes little use of space.

The proposed actuator can further have the following characteristics:
- according to a first possibility, the rupture member comprises a block formed from a shape-memory material, the block being capable of changing shape when it is subjected to an electric or magnetic field so as to apply a tensile stress to the retaining part, causing the rupture of the retaining part,
- according to a second possibility, the rupture member comprises a pyrotechnic composition capable of exploding when it is subjected to an electrical current, causing the rupture of the retaining part,
- the retaining part has a weakened area capable of rupturing in the event of activation of the rupture member, the weakened area is a thinned area of the retaining part, the coupling mechanism comprises an elastic return member capable of biasing the movable disk toward the disengaged position, the movable gear and the output ring each comprise a toothing, and the movable disk comprises a toothing capable of coming simultaneously into engagement with the toothing of the movable gear and of the output ring, the toothing of the movable gear, of the output ring and of the movable disk have a geometry such that the application of a torque between the movable gear and the output ring produces a separating force which biases the movable disk toward the disengaged position, the movable gear comprises a first gear portion and a second gear portion, the coupling mechanism comprising a first movable disk and a second movable disk, the first movable disk being in engagement with the first portion of the movable gear and the output ring so as to make the ring secured to the first portion of the movable gear when the first disk is in the engaged position, and the second movable disk being in engagement with the second portion of the movable gear and the output ring so as to make the ring secured to the second portion of the movable gear when the second disk is in the engaged position, the retaining part is capable of retaining the first disk and the second disk in the engaged position, the rupture of the retaining part allowing disengagement of the output ring, of the first portion of the movable gear and of the second portion of the movable gear, the actuator further comprises an input shaft capable of being driven in rotation by a motor along the axis of rotation, a planet carrier, a plurality of planet gears, each planet gear being rotatably mounted on the planet carrier and being capable of meshing on the one hand with the input shaft, and on the other hand with the fixed gear and the movable gear, and the fixed gear and the movable gear having a different number of teeth from one another so that rotation of the input shaft with respect to the fixed gear drives rotation of the movable gear with respect to the fixed gear.

The invention also relates to an assembly for actuating an aircraft flight control surface comprising an actuator as previously defined and a motor capable of driving the input shaft in rotation.

PRESENTATION OF THE DRAWINGS

Other features and advantages will appear from the description that follows, which is purely illustrative and not limiting, and must be read with reference to the appended drawings, among which.

DETAILED DESCRIPTION OF AN EMBODIMENT

Figure 1:
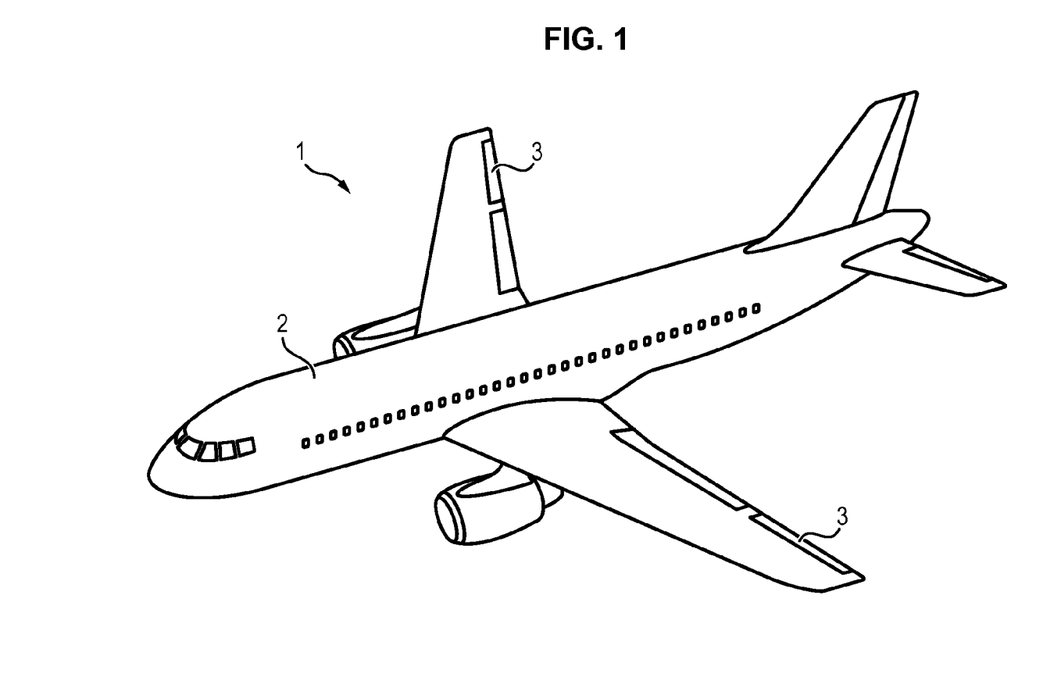
FIG. 1 shows an aircraft schematically.

In FIG. 1, the aircraft 1 shown is an airplane comprising a fuselage 2 and control surfaces 3 mounted movably with respect to the fuselage 2. The control surfaces 3 are ailerons located at the ends of the wings of the airplane. These ailerons 3 make it possible to control the roll motion of the airplane, i.e., the rotational movement of the airplane around the longitudinal axis of the airplane. Each aileron 3 is mounted movable in rotation with respect to the fuselage 2, around an axis of rotation extending substantially parallel to a trailing edge of the wing. The adjustment of the position of each aileron 3 is provided by an actuator assembly comprising one or more control actuator(s) associated with the aileron 3.

Figure 2:
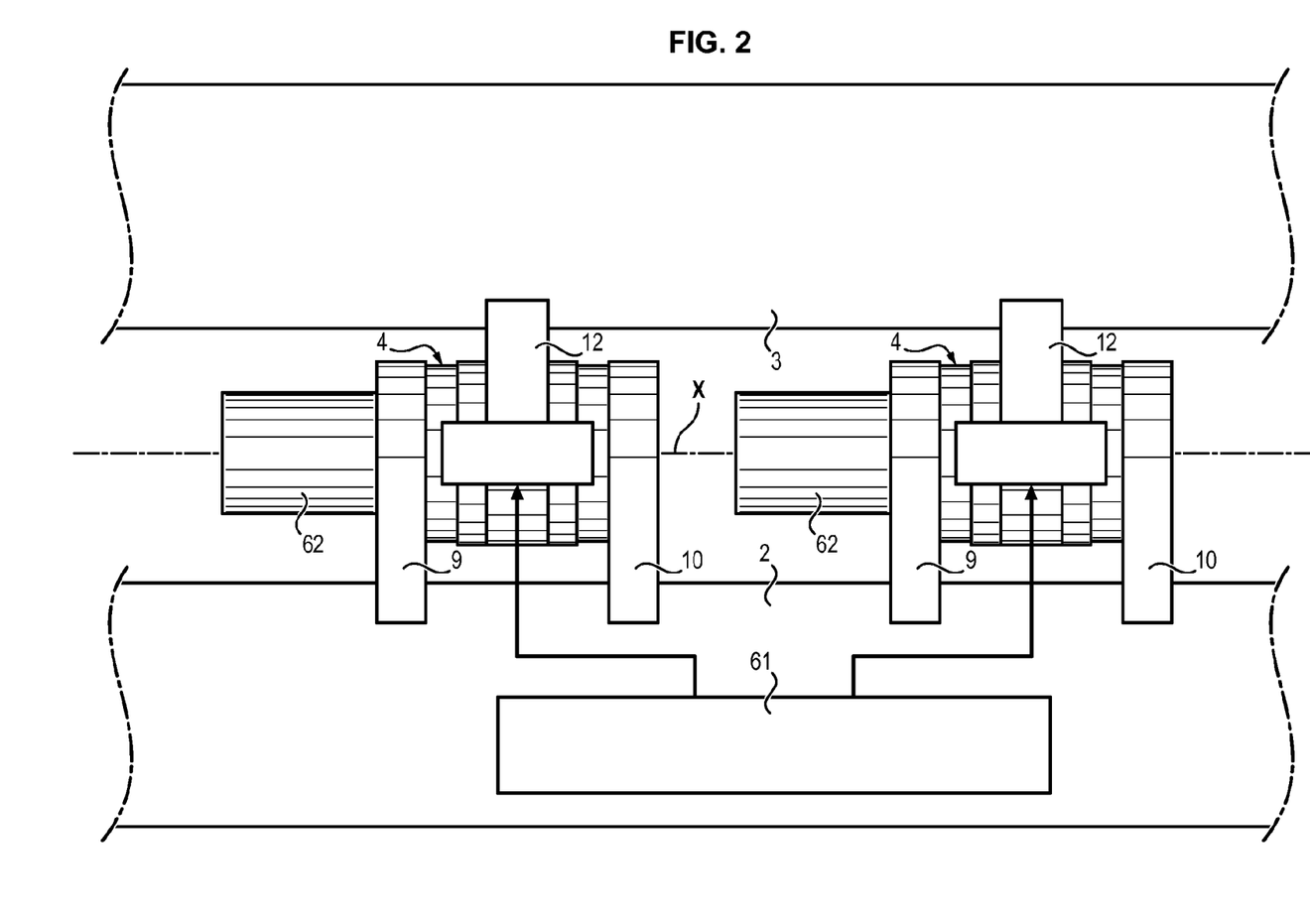
FIG. 2 shows schematically an actuator assembly for a flight control surface.

In FIG. 2, the actuator assembly 60 shown comprises an electronic control unit 61 (ECU), two actuators 4 and two electric motors 62.

The actuators 4 are rotary actuators. Each actuator 4 is connected on the one hand to the fuselage 2 and on the other hand to the control surface 3 and is capable of driving the control surface in rotation around an axis X with respect to the fuselage 2.

Each actuator 4 is capable of being driven by an associated electric motor 62, to adjust the position of the aileron 3 with respect to the fuselage 2. The electric motors 62 are controlled in parallel by the electronic control unit 61.

Figure 3:
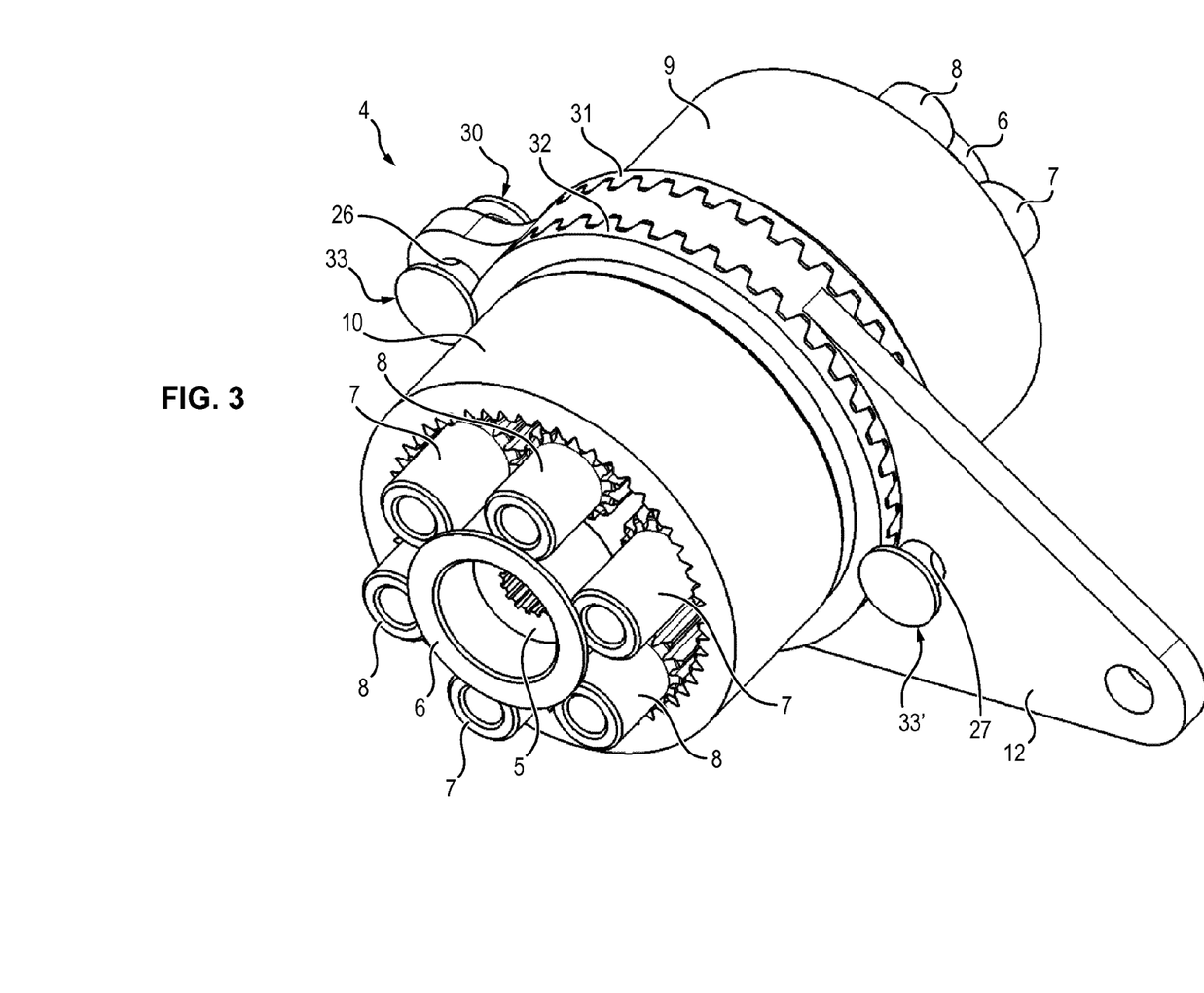
FIG. 3 shows schematically in perspective an actuator according to an embodiment of the invention.
Figure 4:
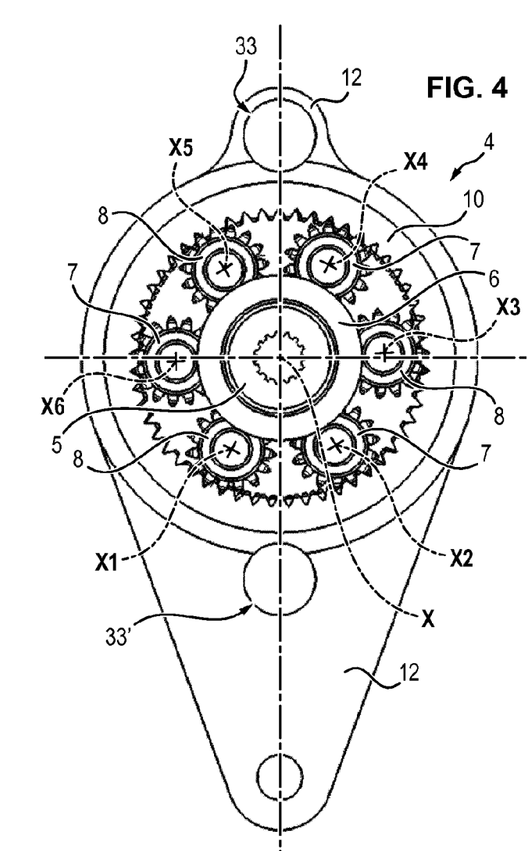
FIG. 4 is a front view of the actuator.
Figures 5, 6:
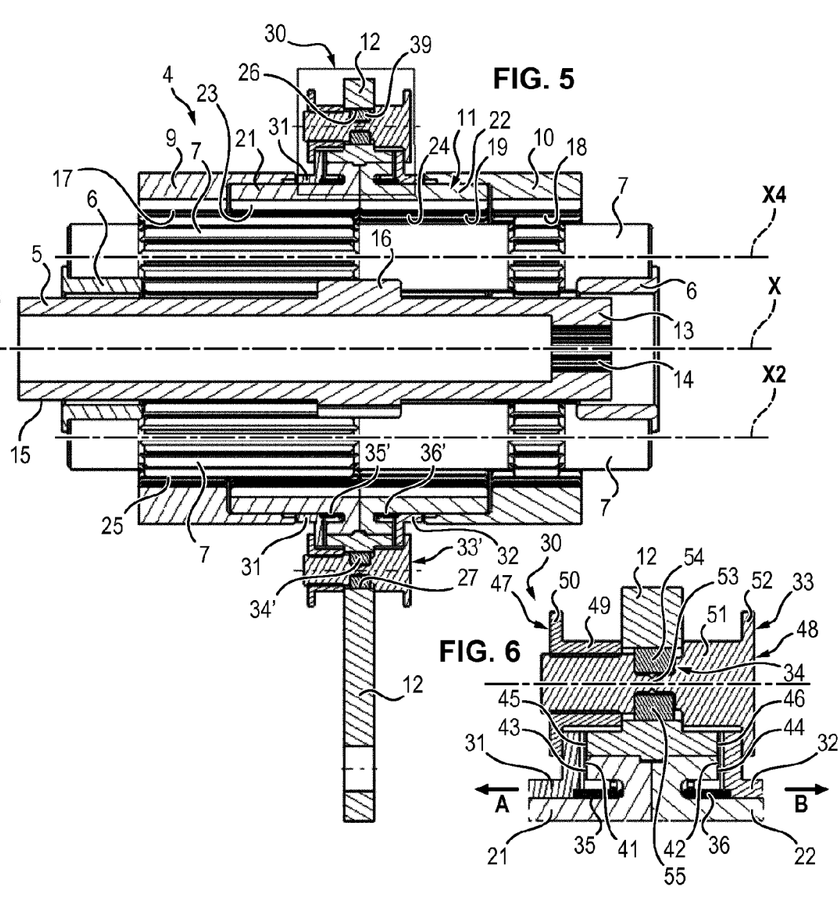
FIG. 5 is a section view of the actuator along a longitudinal section plane A-A.
FIG. 6 is a detail view of the coupling mechanism as shown in area B of FIG. 5.

In FIGS. 3 to 5, the actuator 4 shown comprises an input shaft 5, a planet carrier 6, a plurality of planet gears 7 and 8, two fixed gears 9 and 10, a movable gear 11 and an output ring 12.

The fixed gears are attached to the fuselage 2 of the aircraft, while the output ring 12 is attached to the control surface 3.

The input shaft 5 is rotatably mounted with respect to the fixed gears 9 and 10 around the axis of rotation X. The input shaft 5 is capable of being connected to an electric motor 62 (or to a motor speed reducer) to drive the input shaft 5 in rotation with respect to the fixed gears 9 and 10. To this end, the input shaft 5 has one end 13 equipped with connecting splines 14.

Moreover, the input shaft 5 comprises an external cylindrical surface 15 having a toothed portion 16.

The planet carrier 6 is also rotatably mounted around the axis X. The planet carrier 6 supports the planet gears 7 and 8, each planet gear being rotatably mounted with respect to the planet carrier 6 around an axis of rotation X1 to X6, parallel to the axis X.

Each fixed gear 9, 10 comprises a toothed internal cylindrical surface 17, 18, having a first number of teeth.

The movable gear 11 is positioned between the two fixed gears 9 and 10.

The movable gear 11 is rotatably mounted around the axis X with respect to the fixed gears 9 and 10. The movable gear 11 comprises a toothed internal cylindrical surface 19, having a second number of teeth, different from the first number of teeth.

More precisely, the movable gear 11 comprises a first portion 21 and a second portion 22. The first portion 21 of the movable gear 11 comprises a first internal surface 23 having first teeth. The second portion 22 comprises a second internal surface 24 having second teeth. The first portion 21 and the second portion 22 comprise an identical number of teeth. However, the teeth of the second portion 22 are out of phase with respect to the teeth of the first portion 21, with a phase shift equal to half of a tooth.

Each planet gear 7 and 8 comprises an external surface 25 having teeth, the teeth of each planet gear being capable of meshing, on the one hand, with the teeth of the input shaft 5, and on the other hand with the teeth of the fixed gears 9 and 10 and of the movable gear 11.

More precisely, the actuator 4 comprises first planet gears 7 and second planet gears 8.

The planet gears 7 and 8 are identical with one another. However, the first planet gears 7 are arranged so as to mesh with the first portion 21 of the movable gear 11 (but not with the second portion 22) while the second planet gears 8 are arranged so as to mesh with the second portion 22 of the movable gear 11 (but not with the first portion 21). To this end, the planet gears 7 are positioned head-to-tail with respect to the planet gears 8.

The rotation of the input shaft 5 with respect to the fixed gears 9 and 10 has the effect of bringing about rotation of the planet gears 7 and 8 with respect to the fixed gears 9 and 10. Due to the difference in the number of teeth between the fixed gears 9, 10 on the one hand and the movable gear 11 on the other hand, the rotation of the planet gears 7 and 8 brings about rotation of the movable gear 11 with respect to the fixed gears 9 and 10.

The input shaft 5, the planet carrier 6, the planet gears 7 and 8, the fixed gears 9 and 10 and the movable gear 11 together form an epicyclic reduction gear, making it possible to convert the rotation of the input shaft 5 with respect to the fixed gears 9 and 10 into rotation of the movable gear 11 with respect to the fixed gears 9 and 10 at a lower speed than that of the input shaft 5.

The phase shift between the teeth of the first portion 21 and the teeth of the second portion 22 of the movable gear 11 makes it possible to have planet gears 7 and 8 with a single toothing configuration.

The output ring 12 extends around the movable gear 11. The output ring 12 comprises openings 26 and 27, the openings being provided in diametrically opposite positions in the output ring 12.

Moreover, the actuator 4 comprises a coupling mechanism 30 allowing, in the normal operating mode, making the output ring 12 secured to the movable gear 11 and decoupling the output ring 12 from the movable gear 11 in the decoupled operating mode.

Figure 7:
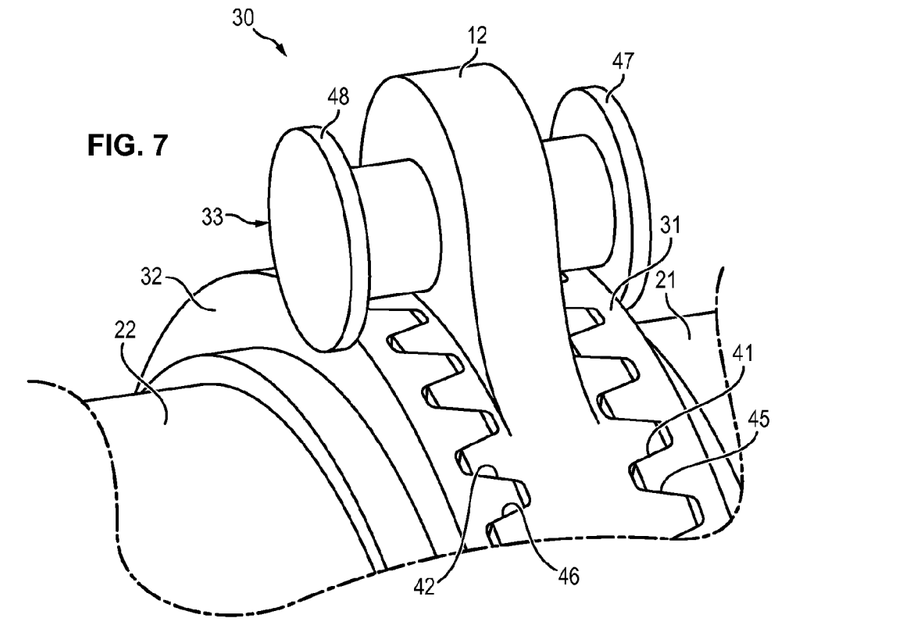
FIG. 7 is a perspective view of the coupling mechanism.
Figure 8:
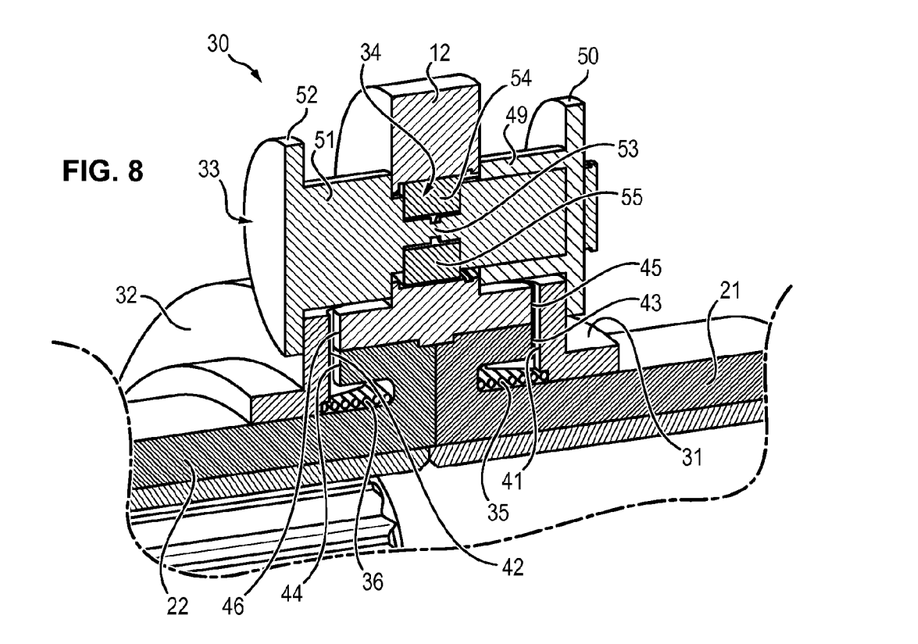
FIG. 8 is a sectioned perspective view of the coupling mechanism.

The coupling mechanism 30 is shown in more detail in FIGS. 6 to 8.

The coupling mechanism 30 comprises a first coupling disk 31, a second coupling disk 32, a retaining assembly 33, a rupture member 34 and elastic return members 35 and 36.

The first coupling disk 31 extends around the first portion 21 of the movable gear 11. Likewise, the second coupling disk 32 extends around the second portion 22 of the movable gear 11. Each coupling disk 31 and 32 comprises a toothing 41 and 42 in the form of a toothed edge.

Moreover, the first portion 21 of the movable gear 11 comprises a toothing 43, also in the form of a toothed edge. Likewise, the second portion 22 of the movable gear 11 comprises a toothing 44 in the form of a toothed edge.

The output ring 12 of the actuator 4 also comprises a first toothing 45 (in the form of a first toothed edge) and second toothing 46 (in the form of a toothed edge).

The first coupling disk 31 is mounted movable in translation with respect to the first portion 21 of the movable gear 11 in a direction parallel to the axis of rotation X of the actuator. In addition, the first coupling disk 31 is movable between an engaged position (illustrated in the figures) in which the toothing 41 of the first disk 31 is engaged both with the toothing 43 of the first portion 21 of the movable gear 11 and with the first toothing 45 of the output ring 12, and a disengaged position (not shown) in which the toothing 41 of the first disk 31 is disengaged from the toothing 43 of the first portion 21 of the movable gear and from the first toothing 45 of the output ring 12.

Symmetrically, the second coupling disk 32 is mounted movable in translation with respect to the second portion 22 of the movable gear 11 in a direction parallel to the axis of rotation X of the actuator. In addition, the second coupling disk 32 is movable between an engaged position (illustrated in the figures) in which the toothing 42 of the second disk 32 is engaged both with the toothing 44 of the second portion 22 of the movable gear 11 and with the second toothing 46 of the output ring 12, and a disengaged position (not shown) in which the toothing 42 of the second disk 32 is disengaged from the toothing 44 of the second portion 22 of the movable gear 11 and from the second toothing 46 of the output ring 12.

In this manner, when the coupling disks 31 and 32 are in the engaged position, the coupling disks 31 and 32 secure the output gear 12 with the two portions 21 and 22 of the movable gear 11. Thus, in normal operation, the output ring 12 is secured in rotation to the movable gear 11.

Due to the fact that they are engaged with the movable gear 11 and the output ring 12, the coupling disks 31 and 32 provide for transmission of torque between the movable gear 11 and the output ring 12.

The toothing 41 to 46 of the movable gear 11, of the output ring 12 and of the coupling disks 31 and 32 have a geometry such that the application of a torque between the movable gear 11 and the output ring 12 produces a separating force which drives the coupling disks 31 and 32 toward their disengaged positions (arrows A and B).

However the coupling disks 31 and 32 abut against the retaining assembly 33 which prevents the displacement of the coupling disks 31 and 32 toward the decoupled position.

The retaining assembly 33 comprises a first retaining part 47 and a second retaining part 48 (or pin).

The first retaining part 47 comprises a hollow cylindrical portion 49 and a collar 50. The second retaining part 48 comprises a cylindrical rod 51 and a collar 52. The rod 51 of the second part is capable of being inserted in the first opening 26 of the output ring 12. Moreover, the hollow cylindrical portion 49 of the first retaining part 47 is capable of being screwed or crimped on the rod 51 of the second retaining part 48 so that the collar 50 of the first retaining part 47 retains the first disk 31 in the engaged position and the collar 52 of the second part 48 retains the second disk 32 in the engaged position.

In other words, the collar 50 of the first retaining part 47 prevents displacement of the first disk 31 toward the disengaged position. Likewise, the collar 52 of the second retaining part 48 prevents a displacement of the second disk 32 toward the disengaged position.

The rod 51 of the second retaining part 48 has a weakened area 53. The weakened area 53 is formed by a thinned portion of the rod 51 of the second retaining part 48, i.e. a portion having a diameter smaller than the diameter of the rest of the rod. This weakened area 53 constitutes a preferred rupture area of the retaining assembly 33 when it is subjected to a tensile stress in the direction of the X axis.

The rupture member 34 is a member capable of being activated by an electric or magnetic signal to rupture the second retaining part 48. To this end, the rupture member 34 comprises two blocks, 54 and 55, each block having a C-shaped transverse section. The blocks 54 and 55 are positioned on either side of the rod 51 of the second retaining part 48. More precisely, the blocks 54 and 55 are positioned on either side of the weakened area 53. Each block 54, 55 is formed of a shape-memory material. Thus, each block 54, 55 is capable of changing shape when it is subjected to an electric or magnetic activation field so as to exert a tensile stress on the second retaining part 48, this stress being sufficient to cause rupture of the second retaining part 48. The blocks 54, 55 are designed so that the tensile stress exerted on the second retaining part 48 is directed parallel to the axis X.

In one variant embodiment, the rupture member 34 can comprise a pyrotechnic composition capable of exploding when it is subjected to an electrical activation current, causing rupture of the second retaining part 48.

The elastic return members 35 and 36 consist of a first spring 35 positioned between the first portion 21 of the movable gear 11 and the first coupling disk 31, and of a second spring 36 positioned between the second portion 22 of the movable gear 12 and the second coupling disk 32. Springs 35 and 36 can be compression springs.

The first spring 35 is arranged so as to bias the first coupling disk 31 toward the disengaged position. In other words, the first spring 35 exerts on the first coupling disk 31 a force tending to move the first coupling disk 31 away from the output ring 12 (in the direction of the arrow A).

Likewise, the second spring 36 is arranged so as to bias the second coupling disk 32 toward the disengaged position. In other words, the second spring 36 exerts on the second coupling disk 32 a force tending to move the second coupling disk 32 away from the output ring 12 (in the direction of the arrow B, opposite to the direction of the arrow A).

In the embodiment illustrated in FIGS. 3 to 8, the coupling mechanism 30 also comprise a second retaining assembly 33', a second rupture member 34' and second elastic return members 35' and 36', which are identical to the retaining assembly 33, to the rupture member 34 and to the elastic return members 35 and 36 previously described.

The retaining assembly 33 is inserted into the first opening 26 of the output ring 12 while the retaining assembly 33' is inserted into the second opening 27 of the output ring 12. Both retaining assemblies 33 and 33' retain the coupling disks 31 and 32 in the engaged position.

In the normal operation of the actuator 4, the input shaft 5 of the actuator 4 is driven in rotation around the axis X with respect to the fixed gears 9 and 10 by the electric motor. Rotation of the input shaft 5 drives a concomitant rotation of the planet gears 7 and 8 with respect to the fixed gears 9 and 10. Due to the difference in the number of teeth between the fixed gears 9, 10 and the movable gear 11, the rotation of the planet gears 7, 8 drives a rotation of the movable gear 11 with respect to the fixed gears 9 and 10.

The output ring 12 being secured to the movable gear 11, the output ring 12 is also driven in rotation with respect to the fixed gears 9 and 10. The rotation of the output ring 12 has the effect of displacing the flight control surface 3 with respect to the fuselage 2 of the airplane.

In the event of detection of jamming in one of the parts of the actuator 4, the actuator 4 is controlled to transition from the normal operation mode into a decoupled operating mode.

To this end, the rupture members 34 and 34' are activated by an electric or magnetic signal. The blocks 54 and 55, subjected to an electric or magnetic field, change their shape, thereby exerting a tensile stress on the second retaining part 48. The tensile stress exerted by the blocks 54 and 55 has the effect of rupturing the retaining part 48 in its weakened area 53.

Once the second retaining part 48 is ruptured, the first coupling disk 31 and the second coupling disk 32 are no longer retained in the engaged position.

Under the influence of the return force exerted by the first return member 35 (respectively the second return member 36) on the first coupling disk 31 (respectively on the second coupling disk 32), each of the disks 31, 32 moves from the engaged position toward the disengaged position. The disk 21 moves in the direction of the arrow A while the disk 22 moves in the direction of the arrow B, opposite.

This displacement toward the disengaged position is also favored by the geometry of the toothing 41 to 46 of the movable gear 11, of the output ring 12 and of the coupling disks 31 and 32 which produce a separating force which is added to the biasing of the return members 35 and 36 to move the coupling disks 31 and 32 away from the output ring 12.

Once the disks 31 and 32 are in the disengaged position, the output ring 12 is disengaged from the movable gear 11.

Moreover, the two portions 21 and 22 of the movable gear 11 are disengaged from one another.

The actuator 4 is then disconnected from the flight control surface 3, and flight control surface 3 can thus be moved by other actuators.

As the retaining assemblies 33 and 33' are arranged at the output of the driving chain of the actuator 4, the proposed device makes it possible to obtain disconnection of the actuator no matter what part in the driving chain is jammed.

The invention claimed is:

1. An aircraft flight control surface actuator, comprising:
   a fixed gear capable of being attached to a fuselage of the aircraft,
   a gear rotatably movable with respect to the fixed gear around an axis of rotation,
   an output ring capable of being attached to the flight control surface, and
   a coupling mechanism comprising a disk movable in translation with respect to the movable gear in a direction parallel to the axis of rotation, the disk being movable between an engaged position in which the disk is in engagement both with the movable gear and the output ring so as to make the output ring secured to the movable gear, and a disengaged position in which the disk is disengaged from the movable gear, so as to decouple the output ring from the movable gear, a retaining part capable of retaining the disk in the engaged position, and a rupture member capable of being activated to rupture the retaining part, so as to allow displacement of the disk into the disengaged position.

2. The actuator according to claim 1, wherein the rupture member comprises a block formed from a shape-memory material, the block being capable of changing shape when it is subjected to an electric or magnetic field, so as to apply a tensile stress to the retaining part, causing the rupture of the retaining part.

3. The actuator according to claim 1, wherein the rupture member comprises a pyrotechnic composition capable of exploding when it is subjected to an electrical current, causing the rupture of the retaining part.

4. The actuator according to claim 1, wherein the retaining part has a weakened area capable of rupturing in the event of activation of the rupture member.

5. The actuator according to claim 4, wherein the weakened area is a thinned area of the retaining part.

6. The actuator according to claim 1, wherein the coupling mechanism comprises an elastic return member capable of biasing the movable disk toward the disengaged position.

7. The actuator according to claim 1, wherein the movable gear and the output ring each comprise a toothing, and the movable disk comprises a toothing capable of coming simultaneously into engagement with the toothing of the movable gear and of the output ring.

8. The actuator according to claim 7, wherein the toothing of the movable gear, of the output ring and of the movable disk have a geometry such that the application of a torque between the movable gear and the output ring produces a separating force which biases the movable disk toward the disengaged position.

9. The actuator according to claim 1, wherein the movable gear comprises a first gear portion and a second gear portion, the coupling mechanism comprising a first movable disk and a second movable disk, the first movable disk being in engagement with the first portion of the movable gear and the output ring so as to make the ring secured to the first portion of the movable gear when the first disk is in the engaged position, and the second movable disk being in engagement with the second portion of the movable gear and the output ring so as to make the ring secured to the second portion of the movable gear when the second disk is in the engaged position.

10. The actuator according to claim 9, wherein the retaining part is capable of retaining the first disk and the second disk in the engaged position, the rupture of the retaining part allowing disengagement of the output ring, of the first portion of the movable gear and of the second portion of the movable gear.

11. The actuator according to claim 1, further comprising:
an input shaft capable of being driven in rotation by a motor along the axis of rotation,
a planet carrier,
a plurality of planet gears, each planet gear being rotatably mounted on the planet carrier and being capable of meshing on the one hand with the input shaft and on the other hand with the fixed gear and the movable gear,
wherein the fixed gear and the movable gear have a different number of teeth from one another so that rotation of the input shaft with respect to the fixed gear drives rotation of the movable gear with respect to the fixed gear.

12. An assembly for actuating an aircraft flight control surface comprising an actuator conforming to claim 11 and the motor capable of driving the input shaft in rotation.

* * * * *